(12) United States Patent
Uchimura et al.

(10) Patent No.: US 6,236,846 B1
(45) Date of Patent: May 22, 2001

(54) WIRELESS RECEIVER HAVING IMPROVED INTELLIGIBILITY OF RECEPTION SIGNALS, AND RECEPTION METHOD THEREFOR

(75) Inventors: Kouichi Uchimura, Kodaira; Akihisa Miyakawa, Koganei; Kazuhiko Yahagi, Kodaira, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,533

(22) Filed: Nov. 23, 1998

(30) Foreign Application Priority Data

Nov. 21, 1997 (JP) ..................................... 9-321145

(51) Int. Cl.⁷ ..................................... H04B 1/10
(52) U.S. Cl. ........................... 455/312; 455/303; 455/306
(58) Field of Search ............................. 455/226.1, 234.1, 455/250.1, 254, 212, 213, 219, 220, 226, 227, 296, 312, 303, 306, 249.1; 381/13

(56) References Cited

U.S. PATENT DOCUMENTS

| | | | |
|---|---|---|---|
| 4,393,513 | * 7/1983 | Yokagawa et al. | 455/243.1 |
| 4,408,098 | * 10/1983 | Kamalski | 381/11 |
| 4,833,715 | * 5/1989 | Sakai | 381/17 |
| 4,893,349 | * 1/1990 | Eastmond et al. | 455/205 |
| 5,001,776 | * 3/1991 | Clark | 455/226.2 |
| 5,175,883 | * 12/1992 | Ueno | 455/242.2 |
| 5,369,470 | * 11/1994 | Hansen | 455/296 |
| 5,369,792 | * 11/1994 | Matsumoto et al. | 455/245.1 |
| 5,408,698 | * 4/1995 | Serizawa et al. | 455/245.1 |
| 5,960,335 | * 9/1999 | Umemoto et al. | 455/226.2 |
| 6,009,129 | * 12/1999 | Kenney et al. | 375/346 |

* cited by examiner

Primary Examiner—Nguyen T. Vo
Assistant Examiner—Charles N. Appiah
(74) Attorney, Agent, or Firm—Antonelli, Terry, Stout & Kraus, LLP

(57) ABSTRACT

A speech band signal is obtained by receiving a wireless frequency signal, a reception field intensity of the wireless frequency is detected on the basis of the resulting speech band signal, the frequency characteristics of the speech band signal so received are changed in accordance with the detection value of the detected reception field intensity, and a speech band signal having the frequency characteristics so changed is outputted.

7 Claims, 6 Drawing Sheets

WIRELESS RECEIVER HAVING IMPROVED INTELLIGIBILITY OF RECEPTION SIGNALS, AND RECEPTION METHOD THEREFOR

BACKGROUND OF THE INVENTION

This invention relates to a wireless receiver and, more particularly, relates to a wireless receiver for improving intelligibility of reception signals and a reception method therefor.

A tone quality switching function of a speaker in a wireless receiver, for example, is one of conventional means for improving intelligibility of reception signals in the wireless receiver. FIG. 1 of the accompanying drawings is a block diagram showing a structural example of a wireless receiver according to the prior art. This drawing shows in detail the construction of a speech power amplification circuit equipped with a speaker tone quality switching function.

As shown in FIG. 1, the wireless receiver includes a reception unit having an antenna 50, a front end portion 51, a first intermediate frequency portion 52, a second intermediate frequency portion 53, a detection circuit 54 and a speech signal processing circuit 55, a speech power amplification circuit 20 coupled to the reception unit and a speaker 2 for reproducing the speech signal form the speech power amplification circuit 20.

The radio wave transmitted from the not-shown partner side wireless transmitter is received by the front end portion 51 through the antenna 50 as the wireless frequency signal (high-frequency signal). The wireless frequency signal received by the front end portion 51 is down-converted to the first intermediate frequency signal by the first intermediate frequency portion 52, and then further down-converted to the second intermediate frequency signal by the second intermediate frequency portion 53.

The output signal from the second intermediate frequency portion 53 is demodulated by the detection circuit 54 and supplied to the speech signal processing circuit 55.

The speech signal processing circuit 55 limits the frequency band of the demodulated signal from the detection circuit 54 to the speech band and amplifies with a predetermined gain thereby to output as a base band signal (speech band signal) to the speech power amplification circuit 20. The speech power amplification circuit 20 includes a tone quality control unit 22 for controlling tone quality of a base band signal from the speech signal processing circuit 55 and a speech power amplifier 14 for amplifying the speech signal controlled by the tone quality control unit 22. The tone quality control unit 22 includes a switch 13, a central processing unit (CPU) 7 such as a microcomputer, a resistor 9, capacitors 10 and 11 and an analog switch 12.

The speech band signal outputted from the speech signal processing circuit 55 is amplified by the speech power amplifier 14 and is outputted as a reception speech from the speaker 2. The analog switch 12 is controlled to an ON state when the control input from the central processing unit 7 is at an "H" (high level) and to an OFF state when the control input is at an "L" (low level), for example.

The circuit including this speech power amplifier 14 forms a high-pass filter (HPF). Because the analog switch 12 is an ON state at the normal time, the cut-off frequency of the HPF is determined by the following equation (1):

$$fc = \tfrac{1}{2}\{2\pi R(C_1 + C_2)\} \qquad (1)$$

Here, R is a resistance value of the resistor 9 and $C_1$ and $C_2$ are the capacitance values of the capacitors 10 and 11, respectively.

When the switch 13 is turned ON, the tone quality switching function is made ON (effective) and the central processing unit 7 outputs a control signal of the "L". Therefore, the analog switch 12 is turned OFF and the cut-off frequency of the HPF is determined by the following equation (2):

$$fc = \tfrac{1}{2}\pi RC \qquad (2)$$

Therefore, the cut-off frequency becomes high when the tone quality switching function is turned ON or made effective. FIG. 2 shows a gain-v-frequency characteristic curve at this time. FIG. 3 shows an NQ (Noise Quieting) curve of the wireless receiver by using a saturation value of an S (Signal) curve (at the time of reception of a 1 kHz standard modulated wave) as a reference level. The frequency characteristics at the time of tone quality switching function ON will be compared with the frequency characteristics at the normal time (tone quality switching function OFF) with reference to the characteristic example shown in FIG. 3. It can be appreciated that the noise output level decreases at a reception input field intensity of about −130 dBm or below at the time of tone quality switching function ON in comparison with the normal time.

In the practical operation of the wireless receiver, however, weak field signals below about −130 dBm are those which are hardly intelligible, and no practical improvement can be attained in intelligibility even when the noise output level is reduced to some extents by turning ON the conventional tone quality switching function.

On the other hand, the reception input field intensity, at which the noise output level increases and intelligibility starts deteriorating drastically is around about −120 dBm on the NQ curve shown in FIG. 3 (at the normal time). Referring to FIG. 3, a remarkable decrease of the noise output level cannot be observed in this area near about −120 dBm even when the tone quality switching function is turned ON. Therefore, even when a user of the conventional wireless receiver recognizes deterioration of intelligibility and turns ON the tone quality switching function during the practical operation, a substantial improvement in intelligibility cannot be acquired easily, and the tone quality switching function often remains at the level of the taste of listening of the user of the wireless set.

SUMMARY OF THE INVENTION

It is an object of the present invention to provide a wireless receiver which eliminates the problems of the conventional technologies described above and improves intelligibility of reception signals, and a reception method therefor.

It is another object of the present invention to provide a wireless receiver which automatically decreases a noise output level in such a manner as to correspond to a reception field intensity when it receives a weak field signal that generates noise quieting corresponding to the reception field intensity near −120 dBm (near a 12 dB SINAD sensitivity point), and reliably improves intelligibility, and a reception method therefor.

According to one aspect of the present invention for accomplishing these objects, there is provided a wireless receiver including a reception unit for receiving a wireless frequency signal and obtaining a speech band signal; a detection unit connected to the reception unit, for detecting a reception field intensity of the wireless frequency signal on the basis of the speech band signal; and a tone quality control unit for changing the frequency characteristics of the speech band signal from the reception unit in accordance with a detection value of the reception field intensity by the detection unit and outputting a speech band signal having the changed frequency characteristics.

According to one embodiment of the present invention, the tone quality control unit described above includes a first route for passing the speech band signal from the reception unit through a filter, a second route for passing the speech band signal from the reception unit and a selection control unit for selecting the speech band signal outputted from one of the first and second routes in accordance with the detection value of the reception field intensity by the detection unit and outputting the signal so selected from the tone quality control unit.

According to another embodiment of the present invention, the second route of the selection control unit described above passes the speech band signal through means (for example, an attenuator) for changing the signal level of the speech band signal.

According to another embodiment of the present invention, the tone quality control unit described above includes an equalizer for changing the frequency characteristics of the speech band signal from the reception unit in accordance with the detection value of the reception field intensity by the detection unit.

In one embodiment of the present invention, a central processing unit outputs a control signal when a wireless receiver receives a weak field signal that generates noise quieting corresponding to a reception field intensity of −120 dBm (near 12 dB SINAD sensitivity point) or below, for example, at the normal time, and an analog switch changes over the circuit between the normal time and at the time of the weak field. In other words, a band-pass filter is inserted automatically into a speech signal processing circuit at the time of the weak field while an attenuator is inserted automatically at the normal time.

In still yet another embodiment of the present invention, when the wireless receiver receives a weak field signal that generates noise quieting corresponding to the reception field intensity of about −120 dBm (near 12 dB SINAD sensitivity point) or below, for example, at the normal time, the central processing unit outputs the control signal, the equalizer circuit changes the speech frequency characteristics and a gain variable circuit compensates for the change of the sound pressure level of the speaker output due to the change of the speech frequency characteristics of the equalizer circuit.

As described above, the wireless receiver according to the present invention can automatically decrease the noise output level when it receives the signal of the weak field, and can remarkably improve intelligibility without imparting any odd feeling to the user of the wireless receiver.

DESCRIPTION OF THE PREFERRED EMBODIMENTS

Figure 1:
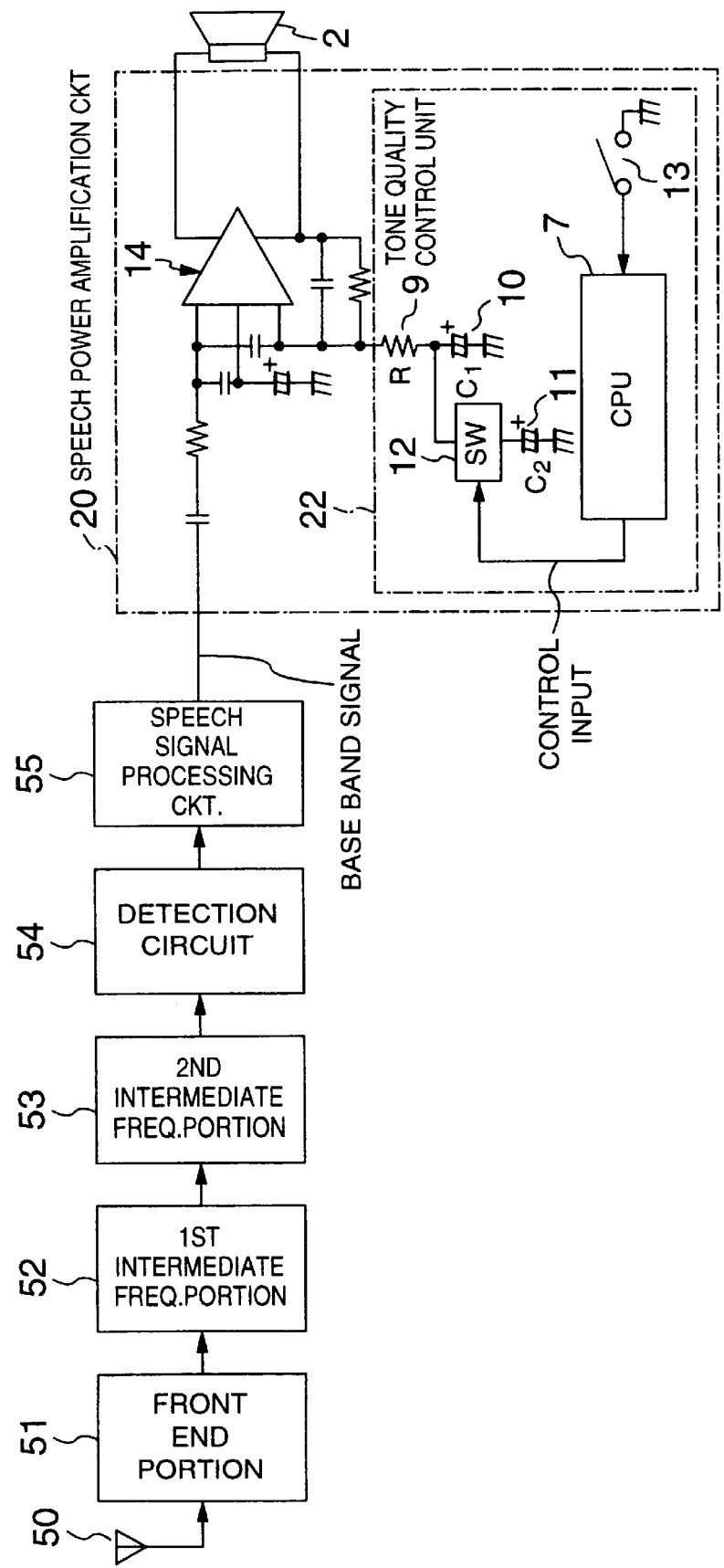
FIG. 1 is a block diagram showing a structural example of a wireless receiver according to the prior art.
Figure 2:
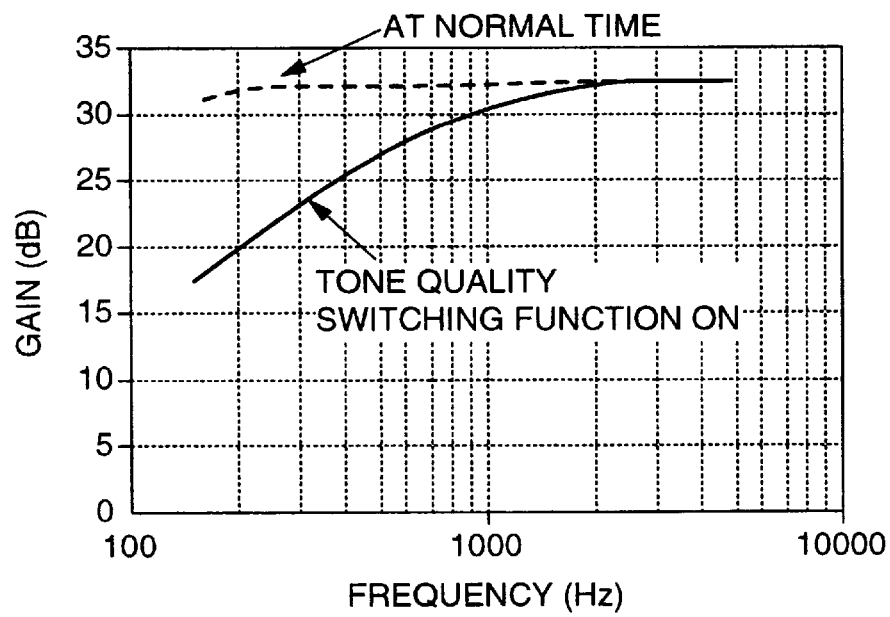
FIG. 2 is a graph showing the relationship between the frequency of an input signal of a speech power amplification circuit and a gain in the conventional wireless receiver shown in FIG. 1.

Wireless receivers according to the embodiments of the present invention will now be explained with reference to the accompanying drawings. In the embodiments that follow, like reference numerals will be used to identify those constituent elements which have the same or similar function as those in FIG. 1.

Figure 4:
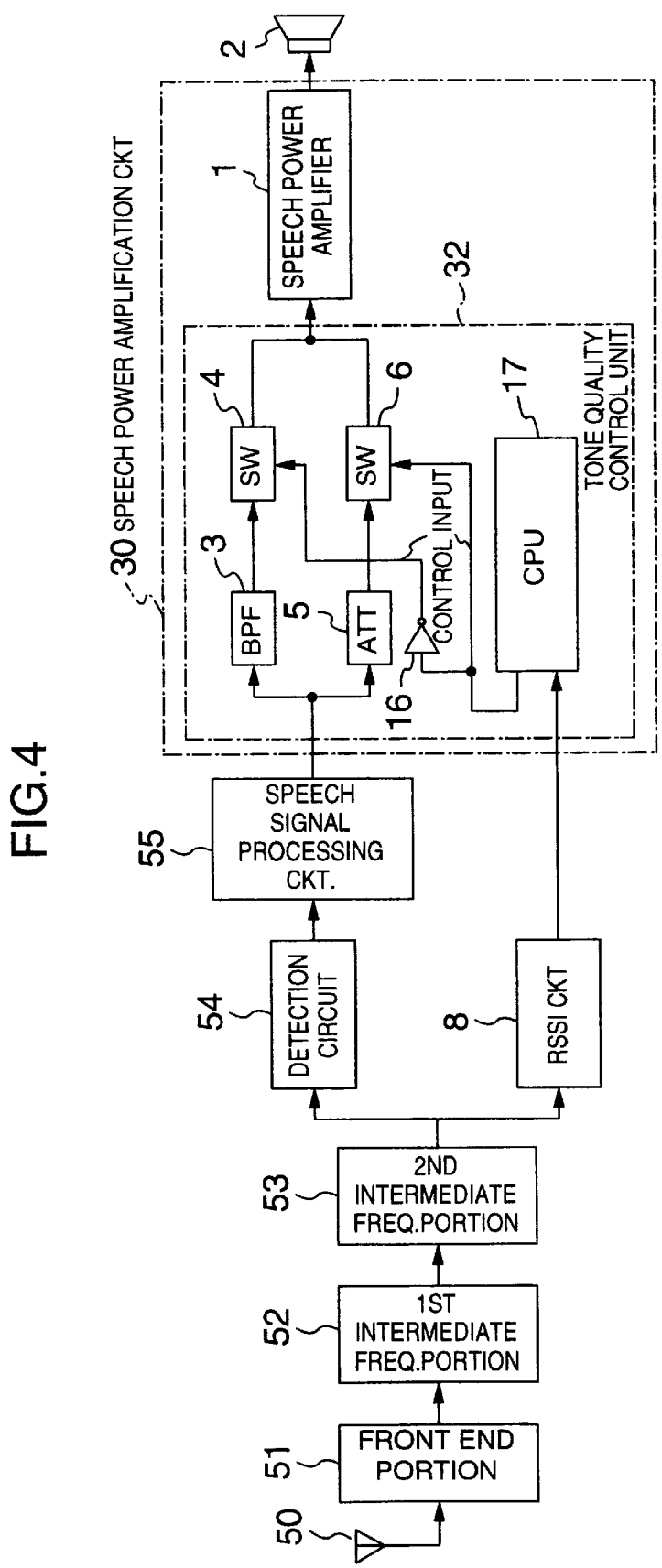
FIG. 4 is a block diagram showing a structural example of a wireless receiver according to a first embodiment of the present invention.

FIG. 4 is a block diagram showing a structural example of a wireless receiver according to the first embodiment of the present invention.

As shown in FIG. 4, the wireless receiver according to the first embodiment of the present invention includes a reception unit having an antenna 50, a front end portion 51, a first intermediate frequency portion 52, a second intermediate frequency portion 53, a detection circuit 54 and a speech signal processing circuit 55, a speech power amplification circuit 20 coupled to the reception unit and a speaker 2 for reproducing the speech signal form the speech power amplification circuit 20.

The radio wave transmitted from the not-shown partner side wireless transmitter is received by the front end portion 51 through the antenna 50 as the wireless frequency signal (high-frequency signal). The wireless frequency signal received by the front end portion 51 is down-converted to the first intermediate frequency signal by the first intermediate frequency portion 52, and then further down-converted to the second intermediate frequency signal by the second intermediate frequency portion 53.

The output signal from the second intermediate frequency portion 53 is demodulated by the detection circuit 54 and supplied to the speech signal processing circuit 55.

The speech signal processing circuit 55 limits the frequency band of the demodulated signal from the detection circuit 54 to the speech band and amplifies with a predetermined gain thereby to output as a base band signal (speech band signal) to the speech power amplification circuit 20.

In this manner, according to the arrangement including the antenna 50, front end portion 51, first intermediate frequency portion 52, second intermediate frequency portion 53, detection circuit 54 and speech signal processing circuit 55, the wireless frequency signal transmitted from the partner side wireless transmitter is received and the speech band signal is obtained.

The output signal of the second intermediate frequency portion 53 is also supplied to a received signal strength indicator (RSSI) circuit 8 (detection unit). The RSSI circuit 8 detects a field intensity of the received signal received by the wireless receiver on the basis of the output signal of the second intermediate frequency portion 53 and outputs a signal (voltage) representing a detected reception field intensity.

In the drawing, a base band signal as the output of the speech signal processing circuit 55 is inputted to a speech power amplification circuit 30 and a speech signal from this speech power amplification circuit 30 is outputted to a speaker 2. The speech power amplification circuit 30 includes a tone quality control unit 32 for controlling tone quality of the base band signal from the speech signal processing circuit 55 and a speech power amplifier 1 for amplifying the speech signal controlled by the tone quality control unit 32. The tone quality control unit 32 includes a filter serving as a frequency characteristic changing means such as a band-pass filter (BPF) 3 and an attenuator (ATT) 5 serving as a signal level changing means, that input the base band output, respectively, an analog switch 4 for inputting the output of the BPF 3, an analog switch 6 for inputting the output of the ATT 5, an inverter 16, and a central processing unit (CPU) 17 (selection control unit) such as a microcomputer for outputting a control signal (control input) in accordance with the signal (voltage) from the RSSI circuit 8. Each of the analog switches 4 and 6 is turned ON when the control input is at a high level ("H") and is turned OFF when the control input is at a low level ("L"), for example. The output of each of these analog switches 4 and 6 is applied to the speech power amplifier 1.

The RSSI circuit 8 generates a voltage equal to or higher than a first predetermined voltage when the wireless receiver receives a signal having a field intensity corresponding to a reception field intensity of at least about −120 dB on an NQ curve at the normal operation time. In response to this voltage, the CPU 17 outputs a control signal (input) of the high level, for example. On the other hand, the RSSI circuit 8 generates a voltage less than the first predetermined voltage when the wireless receiver receives a signal having a field intensity corresponding to a reception field intensity of less than about −120 dB on the NQ curve at the normal operation time. In response to this voltage, the CPU 17 outputs a control signal (input) of the low level, for example.

Next, the operation of the reception unit having the construction described above in this embodiment will be explained.

Figure 3:
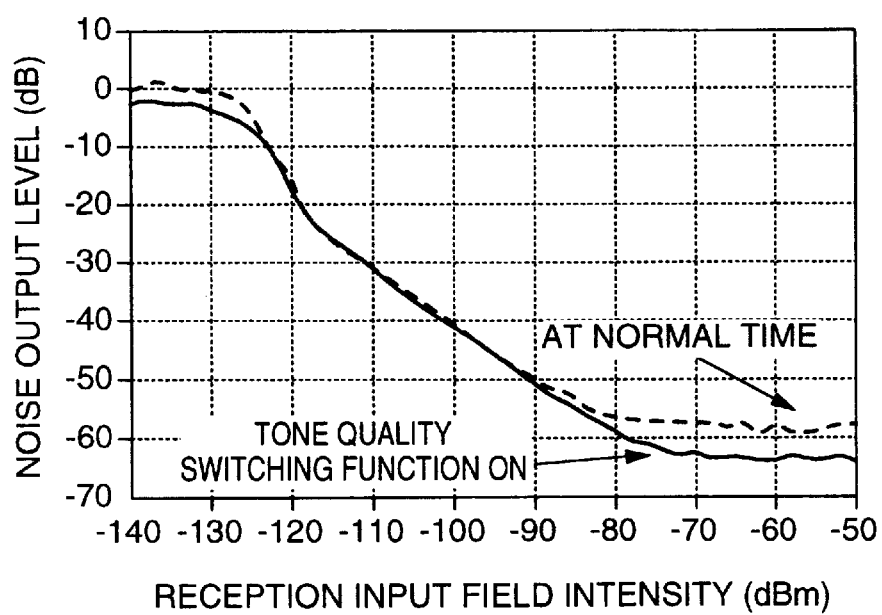
FIG. 3 is a graph showing the relationship between a reception input field intensity and a noise level in the conventional wireless receiver shown in FIG. 1.

When the wireless receiver receives a signal having a field intensity corresponding to an exception field intensity of at least about −120 dB on the NQ curve at the normal time in FIG. 3, the CPU 17 detects the output voltage from the RSSI circuit 8 and outputs a high ("H") level control signal. Since a low ("L") level control signal is inputted to the analog switch 4 through the inverter 16, this analog switch 4 is turned OFF. Since the control signal from the CPU 17 is inputted as such, the "H" level control signal is inputted to the analog switch 6 and this analog switch 6 is turned ON.

In this case, therefore, the speech signal from the base band output is inputted to the speech power amplifier 1 through the attenuator 5 and the analog switch 6 and the speech is outputted from the speaker 2. Hereinafter, this case will be called the "normal time".

On the other hand, when the wireless receiver receives a signal having a field intensity corresponding to a reception field intensity of less than −120 dBm, for example, on the NQ curve (at the normal time) shown in FIG. 3, the CPU 17 detects the voltage from the RSSI circuit 8 and outputs the "L" level control signal. Since the "H" level control signal is inputted to the analog switch 4 through the inverter 16, this analog switch 4 is turned ON. Since the control signal from the CPU 17 is inputted as such to the analog switch 6, the "L" level control signal is inputted and the analog switch 6 is turned OFF.

In this case, therefore, the speech signal from the base band output is inputted to the speech power amplifier 1 through the band-pass filter 3 and the analog switch 4, and the speech is outputted from the speaker 2. This case will be called hereinafter the "tone quality switching function ON time".

Figure 5:
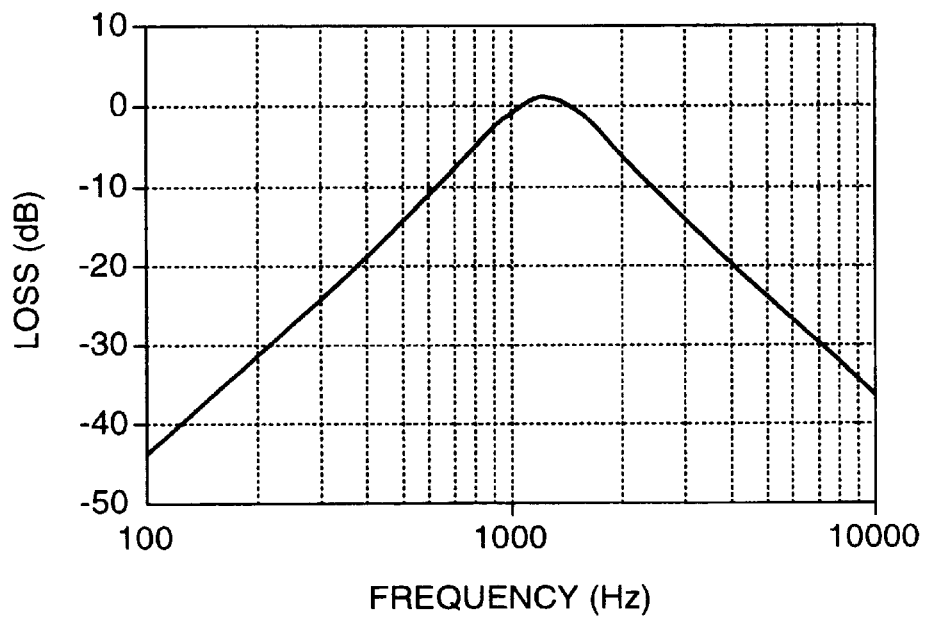
FIG. 5 is a graph showing the relationship between a frequency of an input signal of a secondary pair band-pass filter and a loss in the wireless receiver according to the first embodiment of the present invention.
Figure 6:
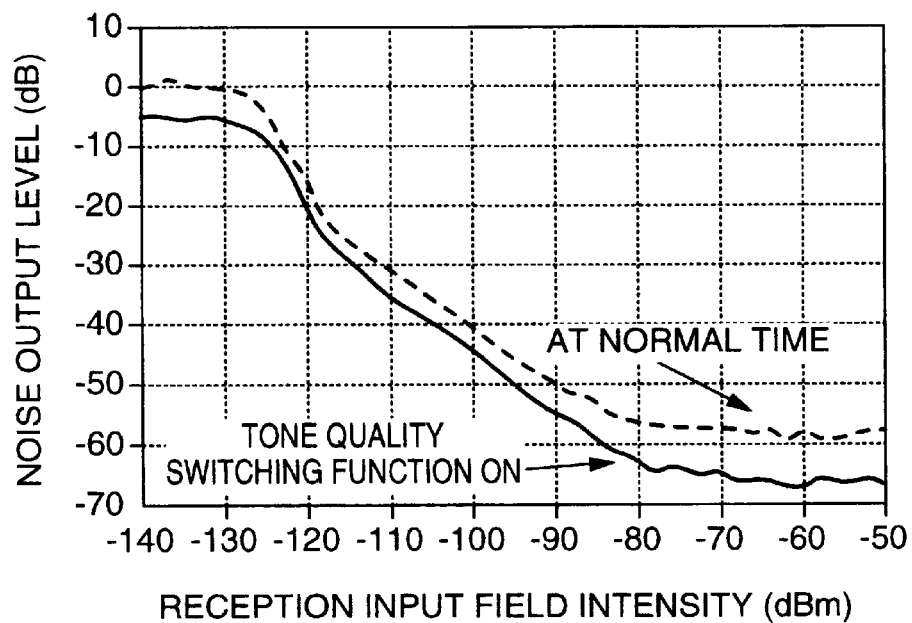
FIG. 6 is a graph showing the relationship between a reception input field intensity and a noise output level in the wireless receiver according to the first embodiment of the present invention.

FIG. 5 shows the frequency characteristics of the band-pass filter 3. This band-pass filter 3 is a secondary pair band-pass filter having a center frequency of 1.25 KHz, for example. FIG. 6 shows an example of the characteristics of the NQ curve of this receiver acquired by using a saturation value of an S curve (at the time of reception of 1 KHz tone, standard modulated wave) as a reference level. It can be appreciated from the example shown in FIG. 6 that the noise output level at the tone quality switching function ON time drastically decreases in the area in the proximity of about −120 dBm as the reception input field intensity at which intelligibility starts deteriorating drastically in comparison with the normal time.

Consequently, when the speech signal passes through the secondary pair band-pass filter 3, the mean sound pressure level outputted from the speaker 2 decreases in comparison with the mean sound pressure level at the normal time. Therefore, the mean sound pressure level of the speaker output at the normal time is decreased by causing the speech signal to pass through the attenuator 5 and the difference of the mean sound pressure level between the level at the normal time and the level at the tone quality switching function ON time is reduced.

Incidentally, intelligibility can be improved effectively by selecting the threshold value of the reception field intensity for switching the normal time and the tone quality switching function ON time from near, or below, a 12 dB SINAD sensitivity point. "12 dB SINAD sensitivity point" represents a reception field intensity in the case where SINAD=20 log $$SINAD = 20\log\frac{S+N+D}{N+D}$$

becomes 12 dB, wherein S, D and N represent a signal component, distortion component and noise component of the received speech signal, respectively. Since this 12 dB SINAD sensitivity point is at about −120 dBm in this embodiment, the threshold value is set to about −120 dBm.

Intelligibility can also be improved effectively by selecting the center frequency of the BPS 3 from the frequency range in which the noise level at the time of switching of tone quality is lower than at the normal time and which is important to obtain practical intelligibility. For example, the range of from about 0.9 kHz to about 1.4 kHz is effective and this embodiment uses 1.25 kHz, for example.

The inventors of the present invention have carried out the following experiments in order to evaluate the improving effect of intelligibility in the embodiments of the invention. A wireless set on the transmission side (wireless transmitter) and a wireless set on the reception side (wireless receiver)

having the same construction as that of the embodiment were prepared. The output of the wireless transmitter and the distance between the wireless transmitter and the wireless receiver were adjusted so that the reception input field intensity by the wireless receiver attained about −120 dBm when a carrier wave was transmitted from the wireless transmitter. Speech signals were transmitted in practice from the wireless transmitter under this state, and the intelligibility improving effect was subjectively evaluated by listeners by switching the mode in which the speech signals were passed through the BPF 3 on the wireless receiver side (switch ON) and the mode in which the speech signals were not passed through the BPF 3 (switch OFF).

The standard for evaluation of the improvement of intelligibility was set to "Improved", "No change" and "Deteriorated". The evaluators comprised ten adult males and three adult females each having normal hearing ability. Incidentally, correction was done in the speech power amplification circuit on the wireless receiver so that tone quality became equal between the case where the speech signals were passed through the BPF and the case where they were not. The judgement of the evaluation result was made by allocating the points 0, 50 and 100 to the three evaluation standards described above, respectively, and calculating the mean from the sum of the evaluation results of the thirteen evaluators. The scores 0 to 33.3, 33.4 to 66.6 and 66.7 to 100% were set to "Improved", "No change" and "Deteriorated", respectively.

The results of these experiments proved that the sum of the evaluation results by the thirteen evaluators was 1,000 and the mean point was 76.9. It was thus confirmed experimentally that intelligibility could be remarkably "Improved" by this embodiment.

Incidentally, the types of the effective band-pass filters vary depending on the value of the reception field intensity. In other words, in order to obtain high intelligibility, it is sometimes preferred to switch a secondary pair band-pass filter and a primary band-pass filter in accordance with the value of the reception field intensity. In such a case, a modified embodiment shown in FIG. 7 obtained by modifying the first embodiment is employed.

Figure 7:
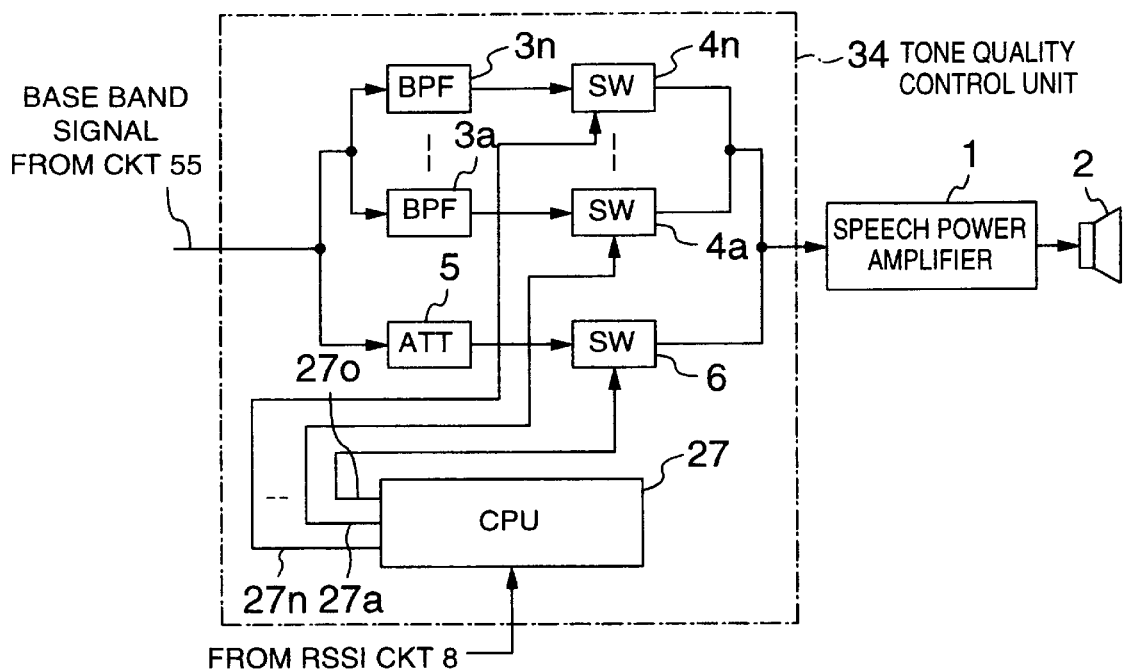
FIG. 7 is a block diagram showing a structural example of a modified embodiment of the wireless receiver according to the first embodiment of the present invention.

Referring to FIG. 7, a plurality of (2 or more) band-pass filters 3a to 3n having mutually different characteristics, such as a secondary band-pass filter and a primary band-pass filter, are disposed in the tone quality control unit 34 in the modified embodiment, and analog switches 4a to 4n are connected in series with these band-pass filters 3a to 3n. The CPU 27 outputs selectively the high level signal to one of the output terminals 27o, 27a to 27n in accordance with the voltage value from the RSSI circuit 8. The output of the output terminal 27o is applied to the analog switch 6. The outputs of the output terminals 27a to 27n are applied to the analog switches 4a to 4n, respectively.

The explanation will be given on the case where the number of band-pass filters is 2, or, the case where band-pass filters 3a and 3n are disposed, for simplification. When the voltage value from the RSSI circuit 8 is 0 to Va, the output of the output terminal 27o is set to the high level and the outputs of other output terminals 27a to 27n, to the low level. When the voltage value from the RSSI circuit 8 is Va to Vn, the outputs of the output terminals Va to Vn are set to the low level and the output of the terminal 27a, to the high level. When the voltage value from the RSSI circuit 8 is greater than Vn, the outputs of the terminals 27o and 27a are set to the low level and the output of the terminal 27n, to the high level.

In this way, one of the switches 6 and 4a to 4n is selectively turned ON in accordance with the voltage value from the RSSI circuit 8 and consequently, the base band output passes through the band-pass filter corresponding to the value of the reception field intensity. Therefore, a wireless receiver can be accomplished which can provide higher intelligibility because the base band output passes through one of the secondary band-pass filter and the primary band-pass filter, for example, in accordance with the value of the reception field intensity.

Next, the second embodiment of the present invention will be explained with reference to FIGS. 8 to 10.

Figure 8:
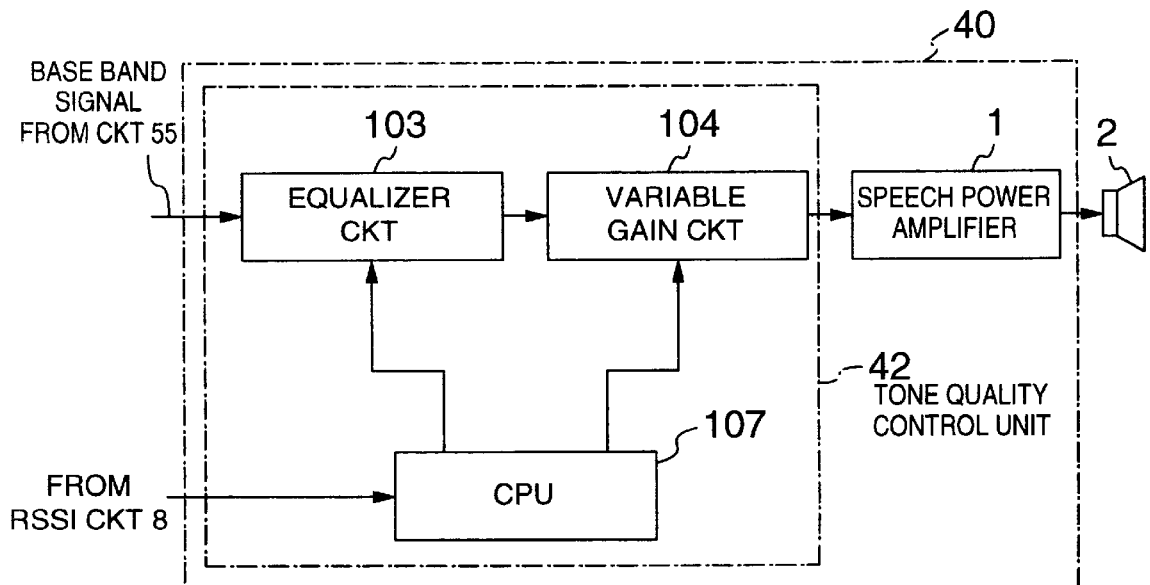
FIG. 8 is a block diagram showing a structural example of a wireless receiver according to a second embodiment of the present invention.

FIG. 8 is a block diagram showing a structural example of a wireless receiver according to the second embodiment of the present invention.

This embodiment uses an equalizer circuit 103 as frequency characteristics changing means and a variable gain circuit 104 as signal level changing means in place of the attenuator 5 and the BPF 3 used in the first embodiment.

The CPU 107 applies the control signal, which so changes continuously (or step-wise) as to correspond to the voltage value from the RSSI circuit 8 in accordance with the value of the reception field intensity, to the equalizer circuit 103 and to the variable gain circuit 104.

The speech signal from the base band output is inputted to the speech power amplifier 1 though the equalizer circuit 103 and the variable gain circuit 104, and the speech is output-from the speaker 2.

Figure 9:
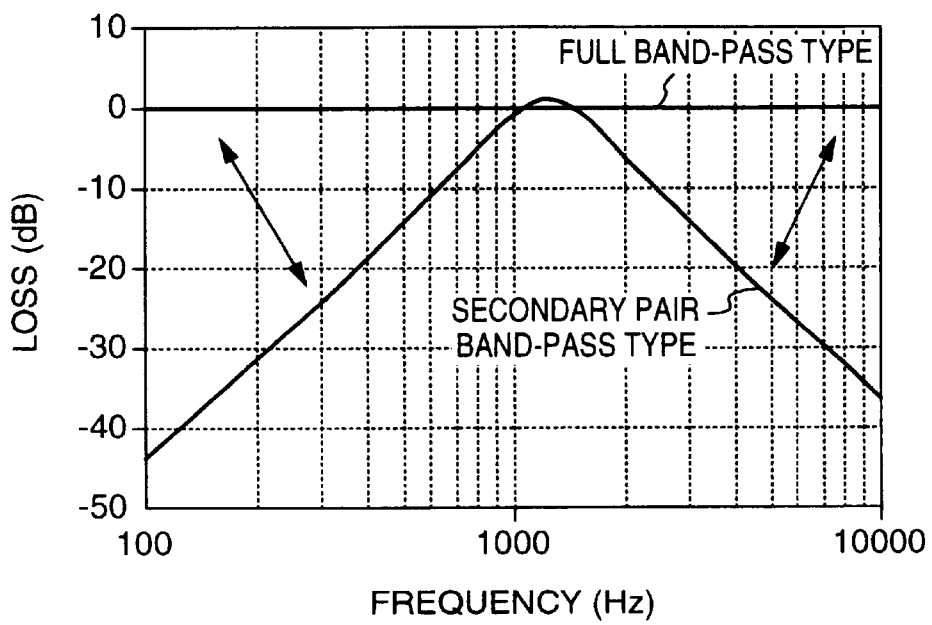
FIG. 9 is a graph showing the relationship between a frequency of an input signal of an equalizer circuit and a loss in the wireless receiver according to the second embodiment of the present invention.
Figure 10:
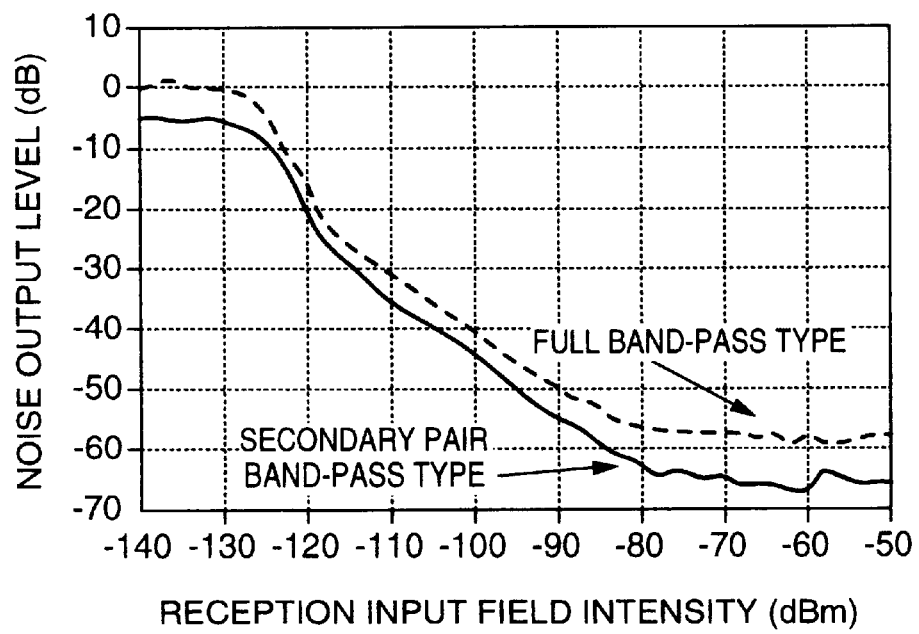
FIG. 10 is a graph showing the relationship between a reception input field intensity and a noise output level in the wireless receiver according to the second embodiment of the present invention.

Next, FIG. 9 shows an example of the frequency characteristics of the equalizer circuit 103. The equalizer circuit 103 changes continuously (or step-wise) from the full (whole) band-pass type having flat speech frequency characteristics to a secondary pair band-pass type having a center frequency of 1.25 kHz as indicated by an arrow depending on the control signal from the central processing unit 107. FIG. 10 shows an example of the characteristics of the NQ curves of the wireless receiver when the speech frequency characteristics of the equalizer circuit 103 is in the case of the full (whole) band-pass type and the case of the secondary pair band-pass type, by using the saturation value of the S curve (1 kHz, at the time of reception of standard modulated wave) as the reference level. It can be appreciated from the example shown in FIG. 10 that the noise output level decreases much more in the secondary pair band-pass type than in the full band-pass type in the area near about −120 dBm (12 dB, SINAD sensitivity point) as the reception input field intensity at which intelligibility starts deteriorating drastically, and intelligibility can be improved.

Here, as the speech frequency characteristics of the equalizer circuit 103 change gradually from the full band-pass type to the secondary pair band-pass type, the mean sound pressure level outputted from the speaker 102 decreases in comparison with the full band-pass type. Therefore, the difference of the mean sound pressure level is reduced at the time of the shift from the full band-pass type to the secondary pair band-pass type by causing the speech signal to pass through the variable gain circuit 104 controlled by the control signal from the central processing unit 107 so as to lower its sound pressure level.

The speech frequency characteristics of the equalizer circuit 103 are so controlled as to attain the speech frequency characteristics corresponding to the reception field intensity by monitoring the reception field intensity detected by the RSSI circuit 8 by the central processing unit 107. In other words, the equalizer circuit 103 is controlled to function as the full band-pass type at the reception field intensity higher than about −120 dBm on the NQ curve (at the normal time) and as the secondary pair band-pass type as the reception field intensity becomes lower from about −120 Dbm.

Therefore, the speech frequency band is changed continuously (or step-wise) or the mean sound pressure level is corrected as the reception field intensity becomes lower so that intelligibility can be improved without any odd feeling. Further, it would be possible to control the equalizer circuit 103 so as to accomplish the effective speech frequency characteristics when the effective speech frequency characteristics are different from the secondary pair band-pass type depending on the value of the reception field intensity.

Incidentally, intelligibility can be improved effectively when the threshold value of the reception field intensity for switching the normal time and the tone quality function ON time is selected from near the 12 Db SINAD sensitivity point or from the range lower than this value in the same way as in the first embodiment having the construction shown in FIG. 4. Since the 12 dB SINAD sensitivity point is about −120 dBm in the wireless receiver of this embodiment, the threshold value is set to about −120 dBm.

Intelligibility can also be improved effectively by selecting the center frequency of the equalizer within the frequency range in which the noise level at the time of switching of tone quality can be reduced much more than at the normal time and which is important for obtaining practical intelligibility. In the case of this embodiment, the range of 0.9 to 1.4 kHz, for example, is effective, and this embodiment sets the center frequency to 1.25 kHz, for example.

The second embodiment having the construction shown in FIG. 8 can obtain the remarkable improving effect in intelligibility in the same way as the first embodiment shown in FIG. 4.

As described above, the present invention can automatically reduce the noise output level when receiving a signal of a weak field and can remarkably improve intelligibility without imparting any odd feeling to the user.

What is claimed is:

1. A wireless receiver comprising:
   a reception unit for receiving a wireless frequency signal to obtain a speech band signal;
   a detection unit, coupled to said reception unit, for detecting a reception field intensity of said wireless frequency signal based on said speech band signal;
   a tone quality control unit, coupled to said detection unit, for changing frequency characteristics of the speech band signal in accordance with an output of said detection unit,
   wherein said tone quality control unit comprises:
      a first path having a filter for passing said speech band signal,
      a second path having an attenuator for passing the speech band signal,
      a selection control unit,
      wherein said selection control unit perform control so that said speech band signal passes said first path when said reception field intensity detection is less than a predetermined value and passes said second path when said reception field intensity is equal to or larger than said predetermined value; and
   an amplifier, coupled to said tone quality control unit, for outputting said speech band signal.

2. A wireless receiver according to claim 1, wherein said predetermined value of said reception field intensity is a 12 dB SINAD sensitivity point.

3. A wireless receiver according to claim 1, wherein said filter is a band-pass filter.

4. A wireless receiver according to claim 3, wherein a range of center frequency of said band-pass filter is from 0.9 kHz to 1.4 kHz.

5. A wireless receiver according to claim 1, wherein said first path comprises:
   a plurality of band-pass filters each of which has a difference characteristic, and
   wherein said selection control unit performs control so as to select one of said plurality of band-pass filters and said second path.

6. A reception method in a wireless receiver, comprising the steps of:
   receiving a wireless frequency signal in a reception unit to obtain a speech band signal;
   detecting a reception field intensity of said wireless frequency signal in a detection unit based on said speech band signal;
   changing frequency characteristics of said speech band signal by a tone quality control unit in accordance with an output of said detection unit, said tone quality control unit comprising a first path having a filter for passing said speech band signal, a second path having an attenuator for passing said speech band signal and a selection control unit;
   controlling by said selection control unit so that said speech band signal passes said first path when said reception field intensity is less than a predetermined value and passes said second path when said reception field intensity is equal to or larger than a predetermined value; and
   outputting said speech band signal from an amplifier coupled to said tone quality control unit.

7. A reception method according to claim 6, wherein said predetermined value of said reception field intensity is a 12 dB SINAD sensitivity point.

* * * * *